(12) United States Patent
Meijer et al.

(10) Patent No.: US 8,124,161 B2
(45) Date of Patent: Feb. 28, 2012

(54) METHOD FOR FINISH-FRYING FOOD PRODUCT PARTICLES

(75) Inventors: Henk-Jan Meijer, Apeldoorn (NL); Rudy Mathias Henricus Heijmans, Westervoort (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 52 days.

(21) Appl. No.: 11/850,966

(22) Filed: Sep. 6, 2007

(65) Prior Publication Data

US 2008/0026130 A1 Jan. 31, 2008

Related U.S. Application Data

(63) Continuation of application No. PCT/NL2006/000127, filed on Mar. 10, 2006.

(30) Foreign Application Priority Data

Mar. 10, 2005 (EP) .................................. 05075585

(51) Int. Cl.
*A23L 1/216* (2006.01)
(52) U.S. Cl. ........ 426/637; 426/302; 426/303; 426/326; 426/272; 426/438; 426/552
(58) Field of Classification Search .................. 426/637, 426/438, 441, 102
See application file for complete search history.

(56) References Cited

U.S. PATENT DOCUMENTS

| | | | | |
|---|---|---|---|---|
| 3,336,960 A | * | 8/1967 | Popper | 426/287 |
| 3,748,153 A | * | 7/1973 | Herbert | 426/511 |
| 3,770,734 A | * | 11/1973 | Fleissner | 544/105 |
| 4,251,555 A | * | 2/1981 | Kroenig | 426/231 |
| 4,933,199 A | * | 6/1990 | Neel et al. | 426/438 |
| 5,171,600 A | | 12/1992 | Young et al. | 426/550 |
| 5,431,944 A | * | 7/1995 | Melvej | 426/552 |
| 5,846,589 A | | 12/1998 | Baker et al. | 426/439 |
| 5,891,494 A | | 4/1999 | Baderscher | 426/52 |
| 2004/0022909 A1 | * | 2/2004 | Holm et al. | 426/510 |

FOREIGN PATENT DOCUMENTS

| | | |
|---|---|---|
| EP | 0 482 709 | 4/1992 |
| FR | 2792810 A1 * | 11/2000 |
| GB | 1 519 049 | 7/1978 |
| GB | 2 347 338 | 9/2000 |
| GB | 2347338 A * | 9/2000 |
| JP | 51-61659 | 5/1976 |
| JP | 59088055 A * | 5/1984 |
| JP | 03077509 A * | 4/1991 |
| JP | 08 173059 | 7/1996 |
| JP | 11-508146 | 7/1999 |
| JP | 2000-509279 | 7/2000 |
| WO | 90/08480 A1 | 8/1990 |
| WO | 97/40706 A1 | 11/1997 |
| WO | 97/040709 A1 | 11/1997 |

OTHER PUBLICATIONS

English abstract of JP 08 173059.
English translation of the claims of JP 08 173059.
English Translation of Notice of Reasons for Rejection relating to corresponding JP Application No. 2008-500650.
English Translation of JP Publication No. 04-502858.
Abstract of GB 1519049 relating to JP 51-61659.
English Abstract of JP 11-508146.
English Abstract of JP 2000-509279.

* cited by examiner

*Primary Examiner* — Patricia George
(74) *Attorney, Agent, or Firm* — Banner & Witcoff, Ltd.

(57) ABSTRACT

The invention provides food product particles obtainable with a method for finish-frying food product particles in superheated steam having a flow rate in the range of from 1 to 20 m/s, at a temperature in the range of from 150-250° C. and for a period of time in the range of from 1 to 5 minutes, wherein more than 75% of the surface of the food product particles is contacted with the superheated steam.

18 Claims, No Drawings

METHOD FOR FINISH-FRYING FOOD PRODUCT PARTICLES

RELATED APPLICATIONS

This application is a continuation of PCT application no. PCT/NL2006/000127, designating the United States and filed Mar. 10, 2006; which claims the benefit of the filing date of European application no. EP 05075585.9, filed Mar. 10, 2005, now EP 1876910 B, granted on Oct. 3, 2006; each of which is hereby incorporated herein by reference in its entirety for all purposes.

FIELD

The present invention relates to a method for finish-frying food product particles in superheated steam, and food product particles obtainable by said method.

BACKGROUND

Food products that need to be finished fried are products that are pre-fried by the food product manufacturer and that need to be finished before consumption by the consumer. In the pre-frying process the food product is partially cooked in oil during which process the food product takes up oil. Once pre-fried, the food product is chilled or frozen and made available to end-users, i.e. restaurants, snack bars and consumers. Pre-fried food products, such as pre-fried potato-based products like French fries, allow for a rapid preparation, because the inside of the food product particles has already been cooked during the pre-frying process. For fried food products to be attractive for end-users, these food products need to have a crispy crust, a good taste, and a good mouth feel, whereas their final preparation step should be short. In addition, pre-fried food products need nowadays from health perspective to have a low fat content.

SUMMARY

The object of the present invention is to provide a finish-frying method which provides very attractive products for consumers in terms of a texture, colour, and taste, whereas at the same time the fried products obtained have a lower fat content than conventionally finish-fried food products, and the fat present in the finish-fried food products is from health perspective of a better quality when compared with food products that have been finish-fried in oil or fat.

Surprisingly, it has been found that this can be established when use is made of a finish-frying method wherein food product particles that have usually been chilled or frozen and stored are contacted with superheated steam.

DETAILED DESCRIPTION OF CERTAIN PREFERRED EMBODIMENTS

Accordingly, the present invention relates to a method for finish-frying food product particles in superheated steam having a flow rate in the range of from 1 to 20 m/s, at a temperature in the range of from 150-250° C. and for a period of time in the range of from 10 seconds to 20 minutes, wherein more than 75% of the surface of the food product particles is contacted with the superheated steam.

The food product particles obtained with the method according to the present invention display excellent properties in terms of texture, colour, and taste. Another advantage of the present method is its positive effect on the environment since odour nuisance related to finish frying with oils will be considerably reduced, and waste oils will no longer be generated. Yet another advantage of the present invention is that the food products obtained with the present method have a low fat content which has a positive influence on the health of consumers, resulting in, for instance, less obesity and cardio-vascular related diseases. Further, it also avoids the use of deteriorated oils, which has an impact on the quality of the food product to be consumed. In addition, it is from a safety point of view noted that the sputtering of oils can advantageously be eliminated, as that thus the development of slippery floors can be avoided.

Preferably, the method according to the present invention is carried out in such a way that more than 90% of the surface of the food product particles is contacted with the superheated steam. More preferably, more than 95% of the surface of the food product particles is contacted with the superheated steam, and most preferably the complete or essentially complete surface of the food product particles is contacted with the superheated steam.

The contact between the surface of the food product particles and the superheated steam can be established in different ways. This can, for example, be established by way of fluidisation.

In other attractive embodiments of the present invention this can be established by carrying out the present method in a rotary drum or carrying it out on a sieve belt or vibrating screen. In fact, any embodiment that can bring about the desired steam flow and contact between steam and the food product particles can suitably be used in the method according to the present invention.

Preferably, the method according to the present invention is carried out in a gas comprising at least 50 volume % of superheated steam, based on total gas. More preferably, the gas comprises more than 90 volume % of superheated steam, based on total gas.

Preferably, the food product particles to be finish-fried in accordance with the present invention have a moisture content of less than 80%, more preferably of less than 75%.

The food product particles that can suitably finish-fried in accordance with the present invention include bakery products, such as doughnuts, meat particles, such as chicken nuggets, fish particles, croquettes, minced-meat hot dogs, vegetable particles, and potato particles or potato-based product particles such as crisps and French fries. It will be understood that not all of these types of food product particles will need to be pre-fried. For instance croquettes and doughnuts are products that are usually not pre-fried. With the present invention such products can now be prepared with a low fat content by means of a subsequent parfry treatment in oil or by applying a spray of oil onto them before they are finish fried in superheated steam. Crisps, that are made from raw or partially dehydrated potato slices, can also be prepared according to the present invention. Preferably, the food product particles to be finish-fried in accordance with the present invention are food product particles that have been pre-fried, i.e. they have at least partly already been cooked in a pre-frying step, after which they are chilled or frozen and stored.

Preferably, the food product particles comprise potato particles or potato-based product particles. More preferably, the food product particles comprise French fries or crisps. Suitably, pre-fried potato particles or potato-based particles have a reduced moisture-content due to the pre-frying step. Pre-fried potato particles or potato-based particles suitably have a moisture content of less than 80%, preferably less than 75%, and more preferably less than 70%, which means that the particles are to quite an extent already cooked in the pre-frying step, allowing a quick finish-frying step. In this respect, it should be noted that, of course, the moisture content of thick pre-fried French fries is generally higher than of thin pre-fried French fries.

The food product particles to be obtained by the present method have an attractive texture in the sense that they will usually have a crispy crust, the formation of which is helped by the presence of starch which can be a component of the food product itself, or the crust can be formed by adding bread-crumbs, batter, flour and the like to the food product particles.

The flow rate of the superheated steam is within a broad range. Preferably, however, the flow rate of the superheated steam is in the range of from 1 to 20 m/s, more preferably in the range of from 5 to 15 m/s and most preferably in the range from 10 to 15 m/s.

The method of the present invention is preferably carried out at a temperature in the range of from 150 to 250° C., and more preferably in the range of from 175 to 220° C.

The method according to the present invention is carried for a period of time in the range of from 10 seconds to 20 minutes. Preferably, the present method is carried out for a period of time in the range of from 3 to 6 minutes, more preferably for a period of time in the range of from 4 to 5 minutes.

Suitably, in accordance with the present invention the part of the surface of the food product particles that is contacted with the superheated steam is contacted with the steam for more than 75% of the period of time, preferably more than 90% of the period of time, more preferably more than 95% of the period of time, and most preferably for the complete or essentially complete period of time.

Suitably, the method in accordance with the present invention is carried out at a pressure in the range of from 0.1 to 10 bara, preferably at a pressure in the range of from 0.9 to 1.1 bara.

The food product particles to be finish-fried with the present method suitably have a fat content in the range of from 0% to 15%, preferably in the range of from 2% to 8%.

The present invention also relates to food product particles obtainable with the method according to the present invention. Such food product particles display unique properties in terms of taste, crispiness, mouth feel and low fat content. Suitable examples of these food product particles include fried bakery products, such as doughnuts, meat particles, such as chicken nuggets, fish particles, vegetable particles, corn snacks, and potato particles or potato-based products particles such as crisps and French fries. Preferably, the food product particles comprise potato particles or potato-based product particles. More preferably, the food product particles comprise French fries or chips.

EXAMPLES

Example 1

French Fries

Non-frozen pre-fried fries (Lord chips, 68% moisture) were finish-fried in superheated steam. The fries were placed in a perforated basket, in such a manner that there was minimal surface contact between the fries (estimated less than 5%). The basket was then placed in a steam vessel and essentially the complete surface of the fries was contacted with superheated steam for a certain period of time. The best results were obtained with the following superheated steam conditions: temperature of 190-200° C., pressure of 1 bar(a), flow of 5 m/s and frying time of 4-5 minutes. The fries so obtained were judged by several people with extended experience in the field of both pre-frying and finish frying. The same non-frozen pre-fried fries were finish-fried in oil (3 minutes, 190° C.) in order to judge the quality of the fries. The steam-fried fries were equally crispy, had the right internal texture and felt clearly less fatty than the oil-fried fries.

Example 2

French Fries

Non-frozen pre-fried fries (Aviko Pom' Plus, 67% moisture) were finish-fried in superheated steam. The fries were placed in a perforated basket, in such a manner that there was minimal surface contact between the fries (estimated less than 5%). The basket was then placed in a steam vessel and essentially the complete surface of the fries was contacted with superheated steam for a certain period of time. Trials were performed at 5 and 10 m/s, both at 1 bar steam pressure and 200° C. For 5 m/s, the best product was obtained at 4.5 minutes frying time. For 10 m/s, the best product was obtained at 3.5 minutes frying time. Both products were good, but the fries fried at 10 m/s were a bit crispier.

Example 3

French Fries

Non-frozen pre-fried fries (Aviko Pom' Plus, 67% moisture) were finish-fried in superheated steam. The fries were placed in a chicken-wire drum. The drum was then placed in a channel. During frying, the drum was rotating and superheated steam was blown upward through the channel and through the drum. Because of the rotation, the fries were fried very uniformly. The frying time was 4-5 minutes, at 200° C., steam pressure of 1 bar(a) and steam flow of 6-7 m/s. The finish-fried fried were judged as being a good product by an expert panel. The fat content of the finish-fried fries was reduced by 50% (5.8% fat vs 11.5% fat for oil-fried fries).

Example 4

Chicken Nuggets

Pre-fried frozen chicken nuggets (brandless, French import) were finish-fried in superheated steam. The nuggets were placed in a perforated basket, in such a manner that there was no surface contact between the nuggets. The basket was then placed in a steam vessel and essentially the complete surface of the nuggets was contacted with superheated steam for a certain period of time. The best results were obtained with the following superheated steam conditions: temperature of 200° C., pressure of 1 bar(a), flow of 5 m/s and frying time of 6 minutes. The nuggets so obtained were very crispy and both the taste and smell were clearly more meaty, like smoked chicken, when compared with the oil-fried (3 minutes, 190° C.) nuggets.

The invention claimed is:
1. A method for treating a food product comprising contacting a chilled or frozen pre-fried French fry with superheated steam having a flow rate in the range of from 1 to 20 m/s, at a temperature in the range of from 175-250° C. and for a period of time in the range of from 10 seconds to 20 minutes as a final preparation, wherein more than 75% of the surface of the food product is contacted with the superheated steam.

2. The method according to claim 1, wherein more than 90% of the surface of the food product is contacted with the superheated steam.

3. The method according to claim 2, wherein more than 95% of the surface of the food product is contacted with the superheated steam.

4. The method according to claim 3, wherein the complete surface of the food product is contacted with the superheated steam.

5. The method according to claim 1, wherein the contact between the food product and the superheated steam is established by way of fluidisation.

6. The method according to claim 1, which is carried out in a rotary drum.

7. The method according to claim 1, which is carried out on a sieve belt.

8. The method according to claim 1, which is carried out on a vibrating screen.

9. The method according to claim 1, wherein the food product has a moisture content of less than 80%.

10. The method according to claim 1, wherein the flow rate of the superheated steam is in the range of from 5 to 15 m/s.

11. The method according to claim 1, wherein the temperature is in the range of from 175 to 220° C.

12. The method according to claim 1, wherein the period of time is in the range of from 3 to 6 minutes.

13. The method according to claim 1, which is carried out at a pressure in the range of from 0.1 to 10 bara.

14. The method according to claim 1, which is carried out in a gas comprising at least 50 volume % of superheated steam, based on total gas.

15. The method according to claim 1, wherein the French fry has a fat content in the range of from 2 to 15% by weight.

16. French fry obtainable with a method according to claim 1.

17. The method of claim 1 wherein the period of time is in the range of from 4 to 5 minutes.

18. The method of claim 1 wherein the flow rate is in the range of 5-15 m/s and the period of time is in the range of from 3 to 6 minutes.

* * * * *